(12) United States Patent
Massarani

(10) Patent No.: US 6,393,484 B1
(45) Date of Patent: May 21, 2002

(54) SYSTEM AND METHOD FOR CONTROLLED ACCESS TO SHARED-MEDIUM PUBLIC AND SEMI-PUBLIC INTERNET PROTOCOL (IP) NETWORKS

(75) Inventor: Leonardo C. Massarani, Westport, CT (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/289,676

(22) Filed: Apr. 12, 1999

(51) Int. Cl.[7] .............................................. G06F 15/16
(52) U.S. Cl. ....................... 709/227; 709/225; 709/228; 709/229; 709/238
(58) Field of Search ................................ 709/225, 227, 709/228, 229, 238

(56) References Cited

U.S. PATENT DOCUMENTS

| | | | |
|---|---|---|---|
| 5,511,112 A | | 4/1996 | Szlam |
| 5,550,984 A | * | 8/1996 | Gelb ........................... 709/224 |
| 5,708,654 A | * | 1/1998 | Arndt et al. ................. 370/242 |
| 5,732,137 A | | 3/1998 | Aziz |
| 5,757,924 A | | 5/1998 | Friedman et al. |
| 5,774,652 A | | 6/1998 | Smith |
| 5,802,285 A | * | 9/1998 | Hirviniemi ................... 709/250 |

(List continued on next page.)

*Primary Examiner*—Saleh Najjar
(74) *Attorney, Agent, or Firm*—Joseph C. Redmond, Jr. Esq.; Morgan & Finnegan, LLP; Richard A. Tonlin, Esq.

(57) ABSTRACT

A system and method prevent unauthorized users and devices, in a dynamic user/device environment, from obtaining access to shared-medium public and semi-public IP networks. A network includes a layered communication system and routers/switches for coupling users and devices to a Dynamic Host Control Protocol (DHCP) server and an authentication server. Databases support the servers. The network incorporates Address Resolution Protocol (ARP). Authorized users and devices register for service by providing the DHCP with user identification for log-in, passwords, MAC addresses, etc. When users connect to the network access point, a DHCP exchange is initiated to obtain a valid IP address and other associated parameters. The DHCP client initiates a MAC broadcast for IP addresses which contain in the request the end user's device MAC address. The associated router switch will pick up and forward to a DHCP server the end user's device request. The DHCP server will process the end user's request and extract the end user's device MAC address. With the end user's MAC address, the DHCP server accesses its device and/or user information in the database. If the MAC address is not registered, the DHCP server refuses to handle the request and logs the attempt, potentially alerting network operators of a security breach. If the MAC address is registered, a DHCP server selects an appropriate IP address and associated parameters to be returned to the requesting end user and connects via programming or command interface to the router switch that is forwarding the DHCP request on behalf of the end user device. The server adds an ARP IP to the MAC address table entry with the selected IP address and end user's MAC address. End user device authentication and IP lease are marked as provisional. A timer is started for a suggested duration. Optionally, the DHCP dynamically sets up filter rules in the router switch limiting access to a subset of IP addresses such as the address of a log-in server. Initial DHCP processing is completed and an IP address is assigned to the requesting end user's device by DHCP. When the timer expires, if the DHCP server finds the authenticating user state is provisional, it will revoke the IP lease, invalidate the corresponding ARP to MAC table entry in the associated router switch, and reset any IP-permissive filtering for that device. If the user is in the full authenticated state, it will simply remove the restrictive filtering.

16 Claims, 4 Drawing Sheets

U.S. PATENT DOCUMENTS

| | | | | |
|---|---|---|---|---|
| 5,884,024 A | * | 3/1999 | Lim et al. | 713/201 |
| 5,905,779 A | * | 5/1999 | Steinmetz | 379/93.01 |
| 5,909,549 A | * | 6/1999 | Compliment et al. | 709/223 |
| 6,003,137 A | * | 12/1999 | Kawasaki | 713/201 |
| 6,012,088 A | * | 1/2000 | Li et al. | 709/219 |
| 6,023,563 A | * | 2/2000 | Shani | 395/200.79 |
| 6,115,376 A | * | 9/2000 | Sherer et al. | 370/389 |
| 6,189,042 B1 | * | 2/2001 | Keller-Tuberg | 709/238 |
| 6,202,156 B1 | * | 3/2001 | Kalajan | 713/201 |
| 6,233,616 B1 | * | 5/2001 | Reid | 709/225 |
| 6,256,739 B1 | * | 7/2001 | Skopp et al. | 713/201 |
| 6,314,531 B1 | * | 11/2001 | Kram | 714/38 |

* cited by examiner

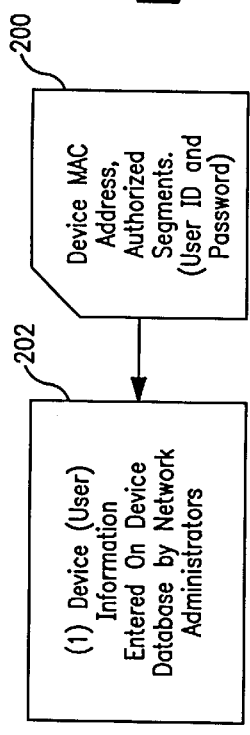
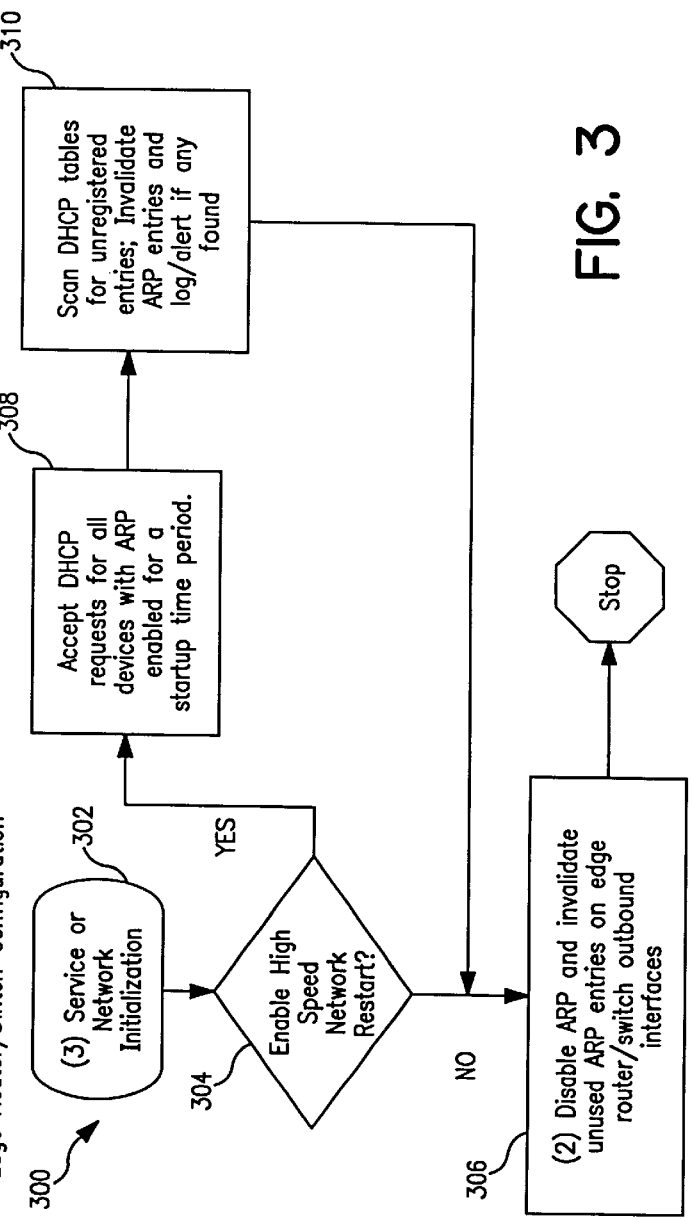

SYSTEM AND METHOD FOR CONTROLLED ACCESS TO SHARED-MEDIUM PUBLIC AND SEMI-PUBLIC INTERNET PROTOCOL (IP) NETWORKS

BACKGROUND OF THE INVENTION

1. Field of the Invention

This invention relates to information networks and methods of operation. More particularly, the invention relates to a system and method for controlled access to shared-medium public and semi-public IP networks.

2. Description of the Prior Art

With the vast increase of private, semi-public and public shared-medium IP networks, a growing problem for network and service administrators is how to control and restrict access to the networks only to authorized and registered devices and users. One example of the problem relates to corporate IP network administrators who deal with an increasingly mobile work force that have deployed IP network access ports (typically IEEE 802.X or similar medium) throughout their corporate facilities for shared use by their corporate employees. Such shared network access ports work in conjunction with Dynamic Host Control Protocol (DHCP) servers to dynamically assign the appropriate IP address and other parameters to a mobile employee's device. A strong concern in the use of such networks is preventing visitors or unauthorized persons from taking advantage of the exposed network access ports to gain IP connectivity to the internal corporate network (intranet).

Another example relates to Internet Service Providers (ISPs) offering public services over shared-medium, such as the increasingly popular cable-modem technology, which in many cases simulates IEEE 802.X medium access over cable TV plants. The distribution medium (cable TV plant) is shared among thousands of homes (users), of which only a subset is paying for internet access using cable modems. The DHCP protocol is also typically used as a means to assign an IP address and other parameters to the cable-modem user attempting to gain network services. In such case, the ISP has a strong interest to prevent unauthorized (non-paying) users from using the IP/internet services by obtaining a usable address for a particular cable plant segment, which is easily accomplished.

Variations of the previous examples also exist using a variety of wire line and wireless access technology and access devices (personal computers, smart internet phones) for internet and intranet services to users sharing a common network medium.

Prior art related to such examples includes:

U.S. Pat. No. 5,732,137 entitled "Method and Apparatus for Secure Remote Authentication in a Pubic Network", issued Mar. 24, 1998, discloses a method and apparatus for user authentication in a network environment between a client computer (workstation) and a remote destination server coupled to a network. A user operating the client workstation provides a log-in address as anonymous file transfer protocol and a password as the user's e-mail address. The destination server compares the user's e-mail address provided as a password to a list of authorized user addresses. If the user e-mail address provided is not on the destination service list of authorized users' addresses, then the user logon request is automatically denied. If the user's e-mail address is located on the list of authorized user's addresses maintained by the destination server, the destination server generates a random number (X) and encrypts the random number in an ASCII representation using encryption techniques provided by the Internet Privacy-Enhanced Mail (PEM). The encrypted random number is stored in the file as the user's anonymous directory. The server further establishes the encrypted random number as a one-time password for the user. The client workstation initiates a file transfer request to obtain the encrypted PEM random number as a file transfer from the destination server. The destination server then sends the PEM encrypted password's random number as the file transfer file over the internet to the client workstation. The client workstation decrypts the PEM encrypted file utilizing the user's private RSA key in accordance with established PEM decryption techniques. The client workstation then provides the destination server with the decrypted random number password which is sent in the clear over the internet to log-in to the destination server. Upon receipt of the decrypted random number password, the destination server permits the user to log-in to the anonymous directory thereby completing the user's authentication procedure and accomplishing log-in.

U.S. Pat. No. 5,757,924 entitled "Network Security Device Which Performs MAC Address Translation Without Affecting the IP Address," issued Mar. 26, 1998 discloses a network security device connected between a protected client and a network. The network security device negotiates a session key with any other protected client. The security device is self-configuring and locks itself to the IP address of the client. Thus, the client cannot change its IP address once set and, therefore, cannot emulate the IP address of another client. When a packet is transferred in from the protected host, the security device translates the MAC address of the client to its own MAC address before transmitting the packet into the network. Packets addressed to the host contain the MAC address of the security device. The security device translates its MAC address to the client's MAC address before transmitting the packet to the client.

U.S. Pat. No. 5,774,652 entitled "Restricted Access Computer System," issued Jun. 30, 1998 discloses a general purpose computing platform in a controlled system including a control hardware device and a control software program. The control hardware device is connected to the computing platform into an access-status device such as a coin hopper or the like. The control software program runs on the computing platform and, in a secure mode, replaces the graphical user interface portion of the operating system of the general purpose computing platform. The control hardware device control software program interoperates to allow access to application software programs on the computing program platform only when certain conditions are satisfied. The control hardware device resets the computing platform if the control software program fails to communicate therewith. The control hardware device also restricts operation of the user keyboard therewith. The control hardware device also restricts operation of the user keyboard and display monitor to reduce the possibility of unauthorized use to the computer system.

The prior art for controlled access to networks is implemented in a combination of dedicated hardware control servers and specialized software. Moreover, the prior art requires extensive modifications to end systems or requires specialized and dedicated hardware to be inserted in front of every network client device. Such systems rely on encryption and sophisticated key management system which makes such techniques expensive, inflexible, and not suitable for shared-medium public and semi-public IP networks.

What is needed is a system and method that is applicable to existing and future network access infrastructures which works in conjunction with popular and established IP protocols and communication layer network equipment without requiring any modifications to currently used internet protocols.

SUMMARY OF INVENTION

An object of the invention is a system and method which makes it impossible or very difficult for unauthorized devices and users to obtain IP network services on shared-medium public and semi-public networks.

Another object is a system and method for controlling access to shared-medium public and semi-public networks using standard network protocols and communication layers without modification.

Another object is a system and method for preventing unauthorized devices and users from obtaining network services in a dynamic user address environment.

These and other objects, features and advantages are achieved in a system comprising communication layers (OSI 2 and 3) and work equipment (routers and/or switches) which work in conjunction with Dynamic Host Control Protocols (DHCP) and Address Resolution Protocols (ARP). Routers and/or switches are configured to disable ARP and IP addresses to MAC addresses on outbound interfaces to network access points. The IP routers and/or switches are configured to accept and forward DHCP requests from user devices to one or more DHCP servers that have access to user and device registration data. In operation at configuration time, authorized users and their authorized devices register for service by providing the DHCP server with user identification for log-in, passwords, MAC addresses, etc. The information is validated and entered into a server database for future authentication queries. When users connect to the network access point, a DHCP exchange is initiated to obtain a valid IP address and other associated parameters. The DHCP client initiates a MAC broadcast for IP addresses which contain in the request, the end user's device MAC address. The associated router/switch picks up and forwards to a DHCP server, the end user's device request. The DHCP server will process the end user's request and extract the end user's device MAC address. With the end user's MAC address, the DHCP server accesses its device, and/or user information in the data base. If the MAC address is not registered, the DHCP server refuses to handle the request, logs the attempt, potentially alerting network operators of a security breach. If the MAC address is registered, the DHCP server selects an appropriate IP address and associated parameters to be returned to the requesting end user and connects via programming or commands interface to the router switch that is forwarding the DHCP request on behalf of the end user device. The server adds the ARP IP to the MAC address table entry with the selected IP address and end user's MAC address. The end user device authentication and IP lease are optionally marked as provisional and a timer is started for a suggested duration. Optionally, the DHCP server dynamically sets up filter rules in the router switch limiting access to a subset of IP addresses such as the address of a log-in server. DHCP processing is completed and an IP address is assigned to the requesting end user's device by DHCP. For enhanced security, end users are optionally instructed to access and authenticate themselves through a log-in server within 60 seconds, after obtaining IP connectivity with DHCP. When the end user successfully authenticates the log-in server, the end user can be moved and the DHCP server changes from provisional to full access. When the timer expires, if the DHCP server finds the authenticating user's state is provisional, the server will revoke the IP lease, invalidate the corresponding ARP to MAC table entry in the associated router/switch, and reset any IP permissive filtering for that device. If the DHCP server finds the user in the full authenticated state, the server will simply remove the restrictive filters so the user can enjoy the full range of authorized IP services.

DESCRIPTION OF DRAWINGS

The invention will be further understood from the following detailed description of a preferred embodiment taken in conjunction with the appended drawings, in which:

FIG. 2 is a flow diagram for device/user registration for service in the network of FIG. 1.

FIG. 3 is a flow diagram depicting edge router/switch configuration in the network of FIG. 1.

DESCRIPTION OF PREFERRED EMBODIMENT

Figure 1:
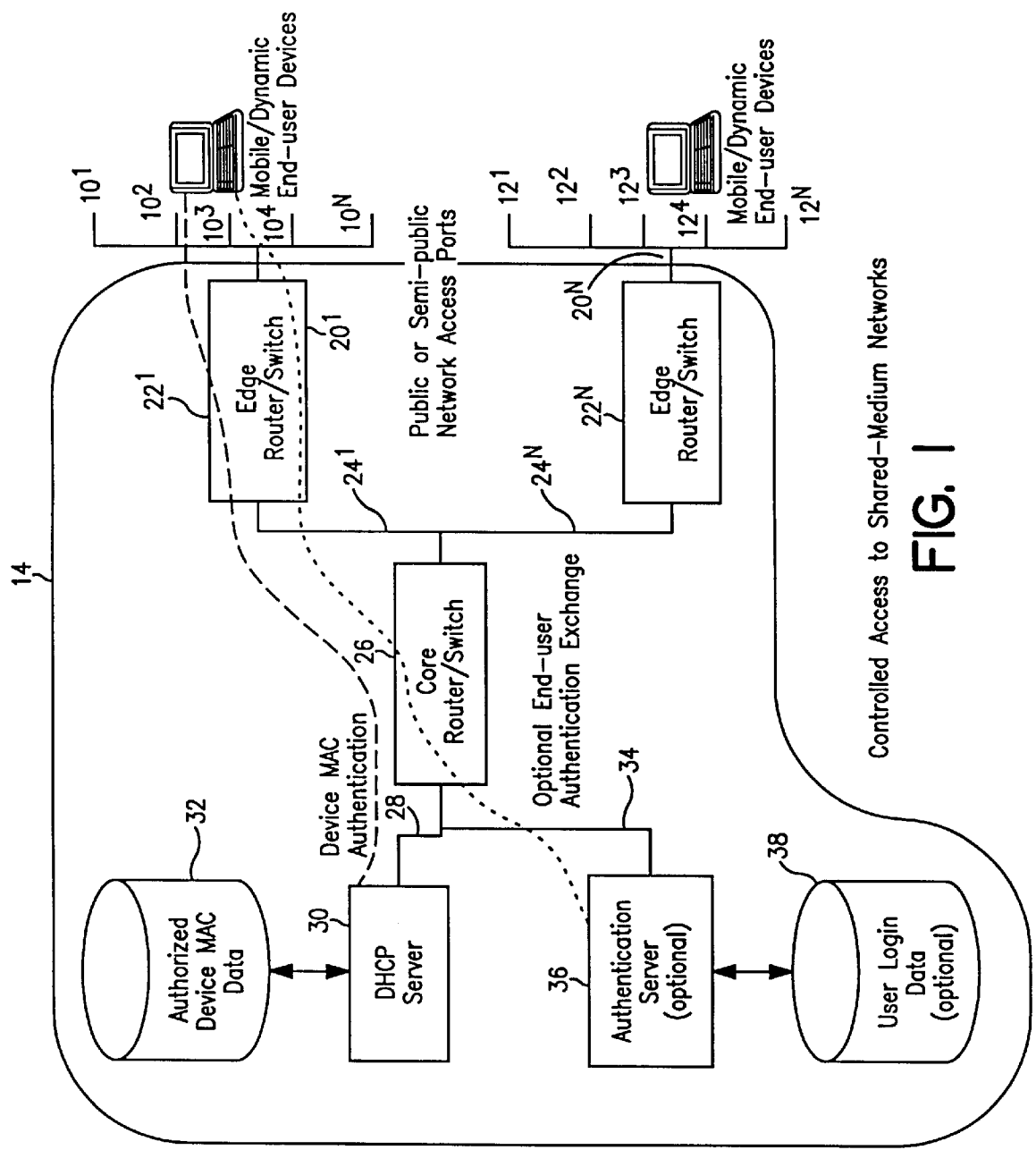
FIG. 1 is a block diagram of a shared network incorporating the principles of the present invention.

In FIG. 1, a plurality of mobile/dynamic end user devices $10^1, \ldots 10^N$; $12^1, \ldots 12^N$, etc., for example PC's, internets, smart phones, etc., are connected to a shared-medium network 14 which prevents unauthorized devices and users from obtaining network services. The devices 10, 12 are connected to the network 14 through a layered communication system, e.g., TCP/IP Open System Interconnection (OSI) using layers 2 and 3. The devices 10, 12 are connected to the network at access ports $20^1, \ldots 20^N$, typically IEEE 802.X or similar medium in which the data link layer 2 includes a Medium Access Control (MAC) sublayer for gaining access to the network. In one form, the shared-medium network is a distributed information s stem using Internet protocols. However, the present invention is adaptable to other non-IP and/or non-DHCP protocol and network technologies that use MAC principles. Alternatively, the end user devices may be part of a cable TV plant which uses Cable Modem (CM) technology which, in many cases, simulates IEEE 802.X medium access over the cable TV plant. In some cases, the cable plant is connected to the network 14 at a Cable Modem (CM) Network Interface Card (NIC) (not shown).

Each access port $20^1, \ldots 20^N$ is coupled to an edge router/switch $22^1, \ldots 22^N$ which choose the best path for a message to the selected destination by dynamic routing. Such routers function at the network layer 3 of the OSI mode. The routers $22^1, \ldots 22^N$ are connected through network links $24^1, \ldots 24^N$ to one or more core router switch 26 which serves as the network backbone. The system includes a program that controls the operation of the network and communicates with the access ports or Network Interface Cards (NIC). The router 26 is coupled through a network link 28 to a Dynamic Host Control Protocol (DHCP) server 30 which automatically assigns TCP/IP configuration information to end user devices, such as Windows and UNIX clients. When a client needs to start up TCP/IP operation, the client broadcasts a request for address information. The DHCP server assigns a new address and sends it to the client together with the address of a router on the same network as the DHCP server and the subnet match for that network. This information is acknowledged by the client and is used to set up its configuration. Examples of DHCP servers are Viacomsoft DHCP Server, Mountain View, Calif. and the IBM DHCP Server for AIX. The server 30 is coupled to a database or sets up configuration data files 32 which include the authorized user identification for log-in; user password; allowable shared network segments to users allowed to connect to the device, and device medium access control address such as the 6 hex digit IEEE 802.X MAC address of a personal computer (PC) or Cable Modem (CM) network interface card. Optionally, the server 30 may be connected through network link 34 to an authentication server 36 which interacts with a user log-in database 38. After validation of the user information in the database 32, the user information is entered into the database 38 for future authentication queries. The authentication server is a suite of custom built or commercial software and hardware that manages access to the network. Example of an authentication server are Safe Word Authentication Server, manufactured and sold by Secure Corporation, San Jose, Calif. and the Radius Server of the IBM Subscriber Management System.

Network Service Provider Administrators configure all the edge routers $22^1, \ldots 22^N$ to disable automatic resolution of IP addresses to MAC addresses on outbound interfaces to shared-medium network accesses ports. As such, an Address Resolution Protocol (ARP) is used disabled for these interfaces. The ARP is a TCP/IP protocol that dynamically binds a network layer IP address to a data link layer physical hardware address. The ARP maps an internet protocol address to a physical machine address that is recognized in the local network. The physical machine address is also known as the MAC address. A table, usually called the cache, is used to maintain a correlation between each MAC address and its corresponding IP address. ARP provides protocol rules for making this correlation and providing address conversion in both directions. When an incoming packet destined for a home machine or a particular Local Area Network (LAN) arrives at a gateway or router, the router asks the ARP program to define a physical host or MAC address that matches the IP address. The ARP program looks in the ARP cache and, if it finds the address, provides it so that the packet can be converted to the right packet length and format and sent to the machine. If no entry is found for the IP address, ARP broadcasts a request packet in a special format to all machines on the network to see if one machine knows that it has the IP address associated with it. The machine that recognizes the IP address as its own returns a reply so indicating. ARP updates the ARP cache for future reference, then sends the packet to the MAC address that replied.

The network service administrator provides remote commands to specific interfaces of routers and switches. The commands recommend the router/switch or interface start-up time, the entire ARP table for the interface being initialized with invalid entries such as Hex-FFFFF on most IEEE 802.X interfaces. In addition, the network service administrator configures the edge IP routing switch gear to accept and forward DHCP requests from user devices to one or more DHCP servers that have access to the user and device registration data described in connection with the database 38. When users connect or power on their devices on the shared-medium network access ports $20^1, \ldots 20^N$ the following operation takes place as described in FIGS. 2–7.

In FIG. 2, an operation 202 is performed in which the authorized users and their authorized access devices register for service by providing such information 200, as user identification for log-in, user password, and allowable shared network segments the user is allowed to connect that device, and MAC address, such as the 6-hex digit IEEE 802.X MAC address of a Personal Computer (PC), or Cable Modem (CM) Network Interface Card (NIC). The information is validated in an operation 202 and entered in a database 38 (see FIG. 1) for future authentication.

In FIG. 3, the network service administrators perform an edge router/switch configuration operation 230 in which the service or network is initialized in an operation 302. A test 304 is performed to enable an optional high speed network re-start. A "no" condition initiates an operation 306 which disables the ARP and invalidates unused ARP entries on edge router outbound interfaces. A "yes" condition initiates an operation 308, which accepts DHCP requests for all devices with ARP enabled for a start-up time period. An operation 310 scans the DHCP table for unregistered entries; invalidates ARP entries and provides a log/alert if any are found and transfers to the operation 306 after disabling of the ARP the configuration operation terminates.

Figure 4:
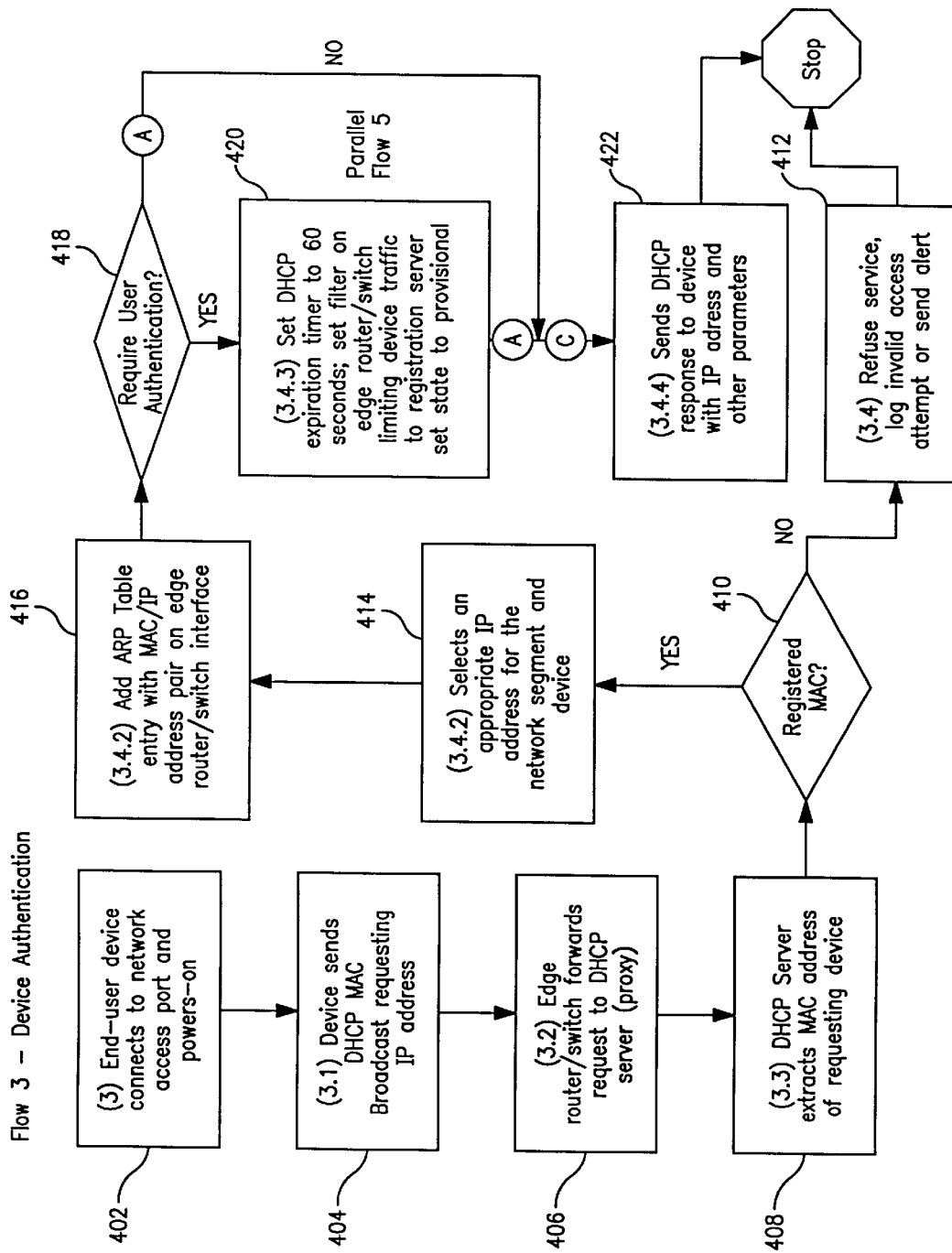
FIG. 4 is a flow diagram for device authentication in the network of FIG. 1.
Figure 5:
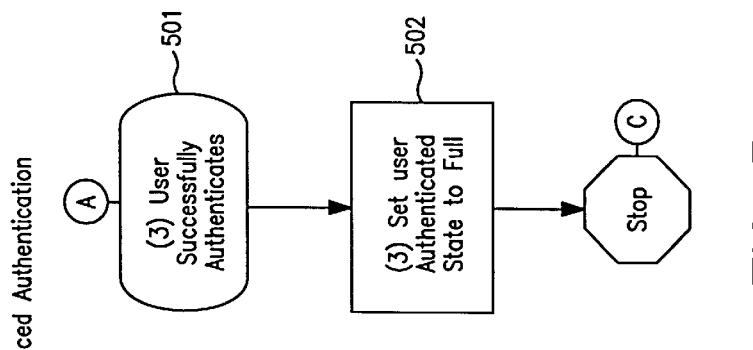
FIG. 5 is a flow diagram for successful device authentication in FIG. 4.

In FIG. 4, a device authentication process 400 is initiated in an operation 402 when the end user device connects to the network access port and powers on. In an operation 404, the end user device such as a PC or CM will initiate a DHCP exchange in an attempt to obtain a valid IP address and other associated parameters. The first part of the exchange, is a MAC broadcast DHCP request for IP address, which contains in the request the end user's device MAC address.

In an operation 406, the associated edge router/switch will pick up and forward to the DHCP server 30 (see FIG. 1) the end user's devices DHCP request. At this point, no IP traffic is yet taking place between the edge router/switch and the end user device; therefore, ARP to MAC conversion is not needed. In an operation 408, the DHCP server will process the end user's device DHCP request and extract the end user's device MAC address from the database 32 (see FIG. 1).

A test 410 is performed to determine whether the MAC address is registered. A "no" condition initiates an operation 412 in which the end user's device MAC address, the DHCP server access devices and/or user information is checked in the service database 32. If the MAC address is invalid, that is, not previously registered, the DHCP server refuses to handle the request, and logs the attempt, potentially alerting network operators of a possible security breach and the process ends. If the MAC address is valid, that is belongs to a registered user, a "yes" condition for the test 410 activates the DHCP server in an operation 414, selects an appropriate IP address and associated parameters to be returned to the requesting end user device.

In an operation 416, the DHCP server connects via a programming or command interface to the end router/switch that is forwarding the DHCP request on behalf of the end user device. The DHCP server adds an ARP IP to the MAC address table entry with the selected IP address and the end user's device MAC address.

A test 418 is performed to authenticate the end user. A "no" condition transfers the program to entry point "A" shown in FIG. 5 in which the user successfully authenticates in an operation 501 and the DHCP sets the user authenticated state to "full", after which the process transfer to entry point C in FIG. 4.

Returning to FIG. 4, a "yes" condition for the test 418 initiates an operation 420 in which the DHCP server sets an expiration timer to 60 seconds and marks the end user's device authentication and IP lease as provisional. The DHCP server sets up filter rules in the edge router/switch limiting access to a subset of IP addresses such as the address of the log-in server, after which the process transfers to entry point "B" in FIG. 7, to be described hereinafter. As a part of the operation 420, short DHCP lease times, typically 10 minutes, should be provided to the end user device to renew the request.

Figure 6:
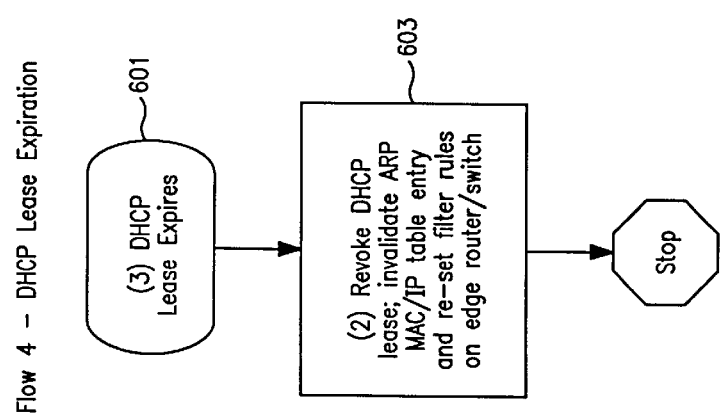
FIG. 6 is a flow diagram DHCP lease expiration in the operation of the network in FIG. 1.

Turning to FIG. 6, if the DHCP lease expires in an operation 601, the DHCP server will invalidate the corresponding ARP IP to MAC table entry in the associated router/switch and reset any IP permissive IP filtering for the device in an operation 603. The operation 603 will limit the window of opportunity for an unauthorized user to explore a network connection once a user disconnects from the system. Using such security operation in the network, an unauthorized user would need not only to guess or obtain a valid IP address and a valid MAC address, but also the associated user log-in/password pair in order to gain and maintain IP connectivity to the network. Such requirements provide very high levels of security while still preserving ease of connection and open shared network access points for end users.

Figure 7:
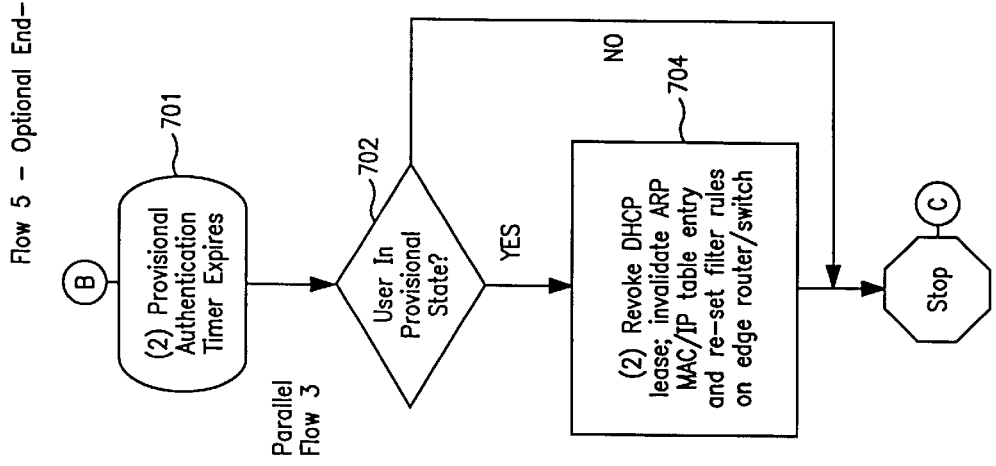
FIG. 7 is a flow diagram depicting the operation of a provisional timer in FIG. 4 upon expiration of the timer.

Turning to FIG. 7, when the provisional authentication timer expires in an operation 701, a test 702 is performed to determine whether the user is in a "provisional" state. A "yes" condition initiates an operation 704. The DHCP server will revoke the IP lease, invalidate the corresponding ARP IP to MAC table entry in the associated router/switch and reset any IP permissive filtering for that device. If the DHCP server finds the user in the "full" authenticated state, it will simply remove the restrictive IP filtering and transfer to entry point "C" in FIG. 4.

Returning to FIG. 4 an operation 422 is performed to send the DHCP response to the device with the IP address and other parameters, after which the process ends.

To expedite user connection to the shared network, the system may be modified to allow users/devices to join the network, after which the system culls the user/devices to identify and disconnect any user/devices failing to have a registered MAC address, as described in connection with FIG. 4.

Summarizing, the present invention enables network and service provider administrators to deliver user friendly and standard-based IP services via shared-medium networks with open access ports while preventing unauthorized users from obtaining services. The effort required for unauthorized users to obtain IP services is very high, particularly with coordination with an optional log-in server. All of these advantages are achieved without additional IP protocols or modification to existing standards or end user devices. The system and method of the present invention can be implemented with existing network gear and end user devices.

While the invention has been described in conjunction with a particular embodiment, various changes can be made therein without departing from the spirit and scope of the invention as defined in the appended claims, in which:

I claim:

1. In a dynamic user/device environment, a system preventing unauthorized user/devices from accessing a shared IP network, comprising:
   a) a plurality of router/switches in a layered communication system coupled to the user/devices at access points;
   b) a Dynamic Host Control Protocol (DHCP) server and database coupled to the router/switches;
   c) means for storing in the database user/device registration information including a Medium Access Control (MAC) address;
   d) means for disabling Address Resolution Protocol (ARP) in the router/switches for MAC addresses in a table at the access points;
   e) means for initiating a user/device request including a MAC address with the DHCP server for access to the network;
   f) means for determining from the request whether the MAC address is registered in the database for the user/device;
   g) means for selecting an appropriate IP address if the user/device is registered or refusing to handle the request if the MAC address is not registered: and
   h) means for adding an ARP to the MAC address table at the router/switch for the selected IP address and user/device MAC address whereby the user/device has provisional access to the network.

2. The system of claim 1 further comprising;
   i) means for allowing a fast network re-start by enabling all user/devices to join the network and subsequently culling the network for unauthorized user/devices.

3. The system of claim 1 further comprising:
   (j) an authentication or login server coupled to the network;
   (k) means for transferring the user/device to full access from provisional access to the network upon successful authentication by the authentication server.

4. The system of claim 1 further comprising:
   (l) means for starting a timer and setting up filter rules in the router/switches for access to an authentication server for login purposes within a selected timing period; and
   (m) means for transferring the user/device to full access from provisional access to the network upon successful authentication by the login server within the selected timing period.

5. The system of claim 4 further comprising:
   (n) means for invalidating the ARP to MAC table entry for the user/device if the timing period expires before authentication of the user/device by the login server.

6. The system of claim 4 further comprising:
   (o) means for resetting the filter rules if the timing period expires before authentication of the user/device by the login server.

7. In a controlled or shared access network including a layered communication system; a DHCP server and database; an Address Resolution Protocol (ARP) installed in the network; an authentication server and a timer for limiting authentication of a user/device to access the network, a method of preventing unauthorized user/devices from obtaining shared network services, comprising the steps of:
   a) initiating a DHCP exchange by a user/device in an attempt to obtain a valid IP address;
   b) initiating a MAC broadcast DHCP request for an IP address which contains the user/device MAC address;
   c) forwarding the request to a DHCP server for processing and extraction of the user/device MAC address;
   d) accessing the database to determine if the user/device is registered;
   e) refusing to handle the request if the user/device MAC address is not registered and invalid;
   f) selecting an appropriate IP address to return to the end user if the address is registered and valid;

g) adding an ARP IP to the MAC address with the selected IP address and the user/device MAC address; and h) granting provisional access to the user/device within a timer period during which the user is authenticated or access is revoked;

i) disabling the Address Resolution Protocol (ARP) in the router/switches for MAC addresses in a table at the access points prior t receiving user/device requests for access to the network.

8. The method of claim 7 further comprising the step of:

j) starting the timer and setting up filter rules in the router/switches for access to the authentication server for login purposes within a selected timing period; and k) transferring the user/device to full access from provisional access to the network upon successful authentication by the authentication server.

9. The method of claim 7 further comprising the step of:

l) invalidating the ARP to MAC table entry for the user/device if the timing period expires before authentication of the user/device by the authentication server.

10. The method of claim 7 further comprising the step of:

m) resetting the filter rules if the timing period expires before authentication of the user/device by the login server.

11. The method of claim 7 further comprising the step of:

(n) allowing a past network restart by enabling all user/devices to join the network and subsequently culling from the network any unauthorized user/device.

12. A medium, executable in a computer system for preventing unauthorized user/devices from obtaining shared network services, comprising:

a) program instructions for initiating a DHCP exchange by a user/device in an attempt to obtain a valid IP address;

b) program instructions for initiating a MAC broadcast DHCP request for an IP address which contains the user/device MAC address;

c) program instructions for forwarding the request to a DHCP server for processing and extraction of the user/device MAC address;

d) program instructions for accessing the database to determine if the user/device is registered;

e) program instructions for refusing to handle the request if the user/device MAC address is not registered and invalid;

f) program instructions for selecting an appropriate IP address to return to the end user if the address is registered and valid;

g) program instructions for adding an ARP to the MAC address with the selected IP address and the user/device MAC address; and h) program instructions for granting provisional access to the user/device within a timer period during which the user is authenticated or access is revoked;

i) program instructions for disabling the Address Resolution Protocol (ARP) in he router/switches for MAC addresses in a table at the access points prior t receiving user/device requests for access to the network.

13. The medium of claim 12 further comprising:

j) program instructions for starting the timer and setting up filter rules in the router/switches for access to the authentication server for login purposes within a selected timing period; and k) program instructions for transferring the user/device to full access from provisional access to the network upon successful authentication by the authentication server.

14. The medium of claim 12 further comprising:

l) program instructions for invalidating the ARP to MAC table entry for the user/device if the timing period expires before authentication of the user/device by the authentication server.

15. The medium of claim 12 further comprising:

m) program instructions for resetting the filter rules if the timing period expires before authentication of the user/device by the login server.

16. The medium of claim 12 further comprising:

n) program instructions for allowing a past network restart by enabling all user/devices to join the network and subsequently culling from the network any unauthorized user/device.

* * * * *